B. M. W. HANSON.
METAL WORKING MACHINE.
APPLICATION FILED DEC. 23, 1908.
940,928.
Patented Nov. 23, 1909.
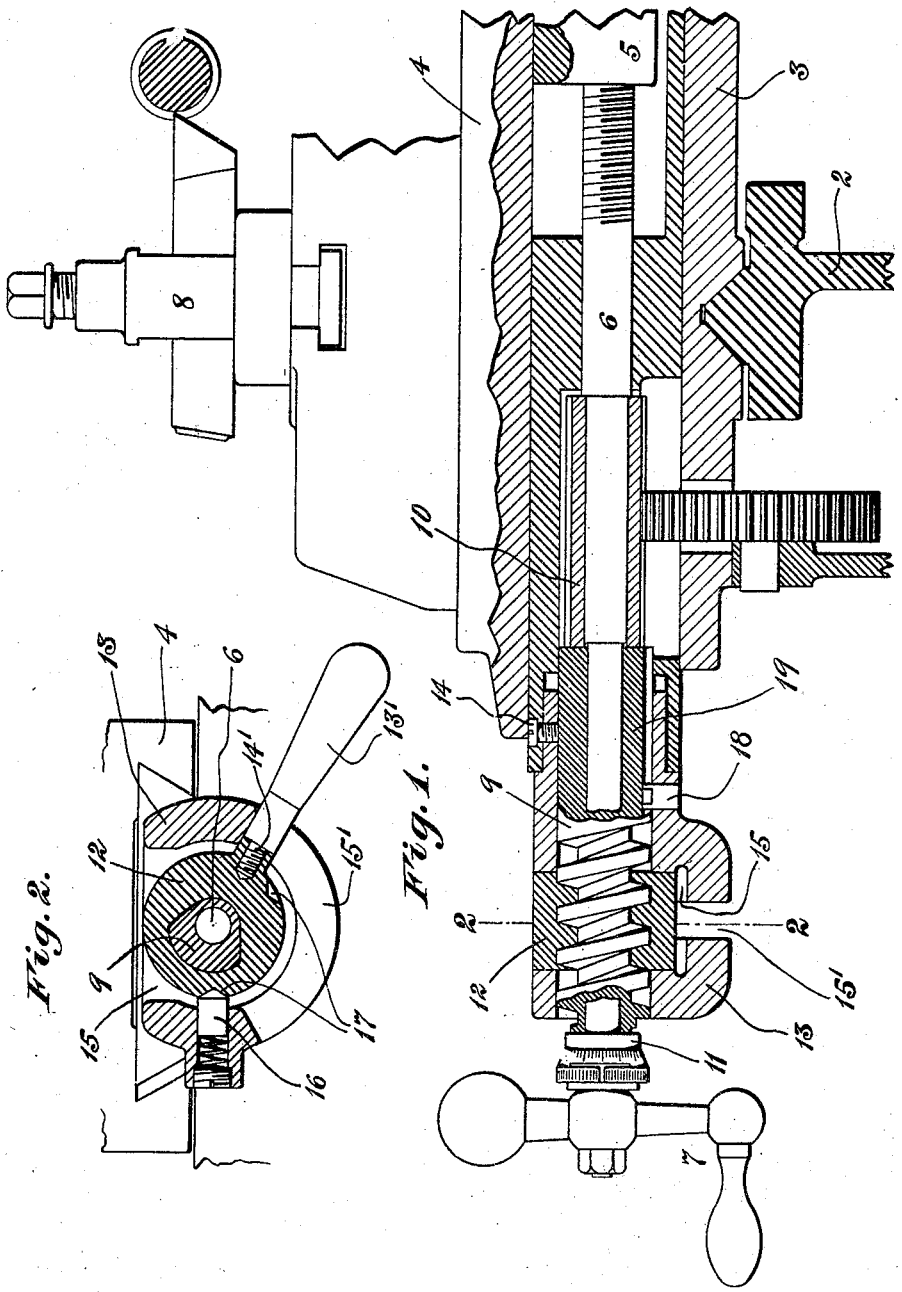
Witnesses:
Ernest B. Bishop
Daniel B. Westin
Inventor:
B. M. W. Hanson
By his Attorneys,
Sutherland & Anderson

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

METAL-WORKING MACHINE.

940,928.  Specification of Letters Patent.  Patented Nov. 23, 1909.

Application filed December 23, 1908. Serial No. 468,949.

*To all whom it may concern:*

Be it known that I, BENGT M. W. HANSON, a citizen of the United States, residing at Hartford, in the county of Hartford and State of Connecticut, have invented certain new and useful Improvements in Metal-Working Machines, of which the following is a specification.

This invention relates to metal working machines and especially to lathes the primary object of the invention being to provide simple and effective means for shifting the cross slide independently of the adjusting mechanism therefor by virtue of which it will be possible to so operate said slide at any time that the latter may be retracted from its advanced position and then returned to the latter without in any wise affecting the previously made adjustment of said slide.

In the drawings accompanying and forming part of the present specification I represent in detail one form of embodiment of the invention which to enable those skilled in the art to practice said invention will be fully set forth in the following description while the novelty of the invention will be included in the claims succeeding said description.

Referring to said drawings, Figure 1 is a transverse sectional view of an engine lathe provided with slide actuating mechanism comprising my invention, and, Fig. 2 is a transverse section on the line 2—2 of said Fig. 1.

Like characters refer to like parts in both views.

In the drawings I have illustrated portion of the bed 2 of an engine lathe the same being equipped with suitable ways for the support of a carriage as 3 which is shown as supporting a cross slide 4, furnished with a nut as 5 rigid with said slide. Coöperative with said nut is a feed-screw 6 shown as provided with a handle or crank arm 7 at its outer end by turning which said cross slide can be moved back and forward or away from or toward the work, said nut and screw being generally relied upon to effect the adjustment of the said cross slide with respect to the work. Said cross slide is provided with the customary appurtenances including the tool post 8. In addition to the said feed-screw and nut for effecting the adjustment of the cross slide I prefer to provide a second nut and screw for also operating the cross slide the second nut and screw operating independently of the other screw and nut and also without changing the relation between said last mentioned parts. The second screw and nut for illustration may be utilized to move the cross slide away from the work after the carriage 3 has finished its advancing stroke, a cut having been made by the tool on the tool post 8. What I have termed the second screw and nut may be related with the said cross slide in various ways although I find that the nut can to advantage directly coöperate with the said feed-screw 6 although as will be clear this relation is not essential although it is one that is quite compact.

A bearing 9 is shown as surrounding the feed-screw 7 near the outer end thereof and as externally threaded to present a secondary feed screw, the feed-screw 7 constituting a primary or adjusting one. In using the terms "primary" and "secondary" I do so merely for convenience and do not intend to indicate that one is subsidiary or subordinate to the other. Preferably the bearing or secondary feed screw 9 is held against endwise movement with respect to the primary feed-screw 7 and this relation can be secured by having the ends thereof abut against the gear 10 and the rigid collar 11 both carried by said feed-screw 7. It is therefore apparent that when an end thrust is given to the feed-screw 9 the feed-screw 7 will be also operated to correspondingly operate the cross slide 4. The said screw or bearing 9 is therefore reciprocative and it in turn reciprocates the feed-screw 7. The gear or barrel pinion 10 is connected with the feed-screw 7 in any desirable manner and forms part of the power-operated mechanism for reciprocating the carriage.

The nut for operating the screw 9 is denoted by 12 and it is shown as supported by and held against movement bodily or with the screw by a boxing or bracket as 13 connected in some fixed manner with the carriage 3. For instance the hub of said boxing or bracket 13 may be set into an opening in the carriage and held therein by one or more screws as 14. The screw 9 extends through the boxing 13 and the latter has a transverse slot 15 in which the nut 12 is comparatively closely fitted said slot intersecting the opening of the boxing through which said screw 9 extends. It will be evident therefore that by turning the nut 12 the screw 9 can be reciprocated, its particular stroke depending upon the direction in which said nut is turned. The reciprocation of said nut of course similarly reciprocates the feed-screw 6 so that the slide 4 can be moved outward or inward and this result can be accomplished without affecting the relation between said feed-screw 6 and its coöperating nut 5 the consequence being that if an adjustment has been made it will not be affected by such operation of the screw 9.

Any suitable means may be provided for turning the nut 12 for moving the screw 9 in an endwise direction; for this purpose I have shown a handle 13' having a threaded stud 14' at its inner end tapped into said nut and adapted to traverse a slot as 15' in said boxing 13 the slot being sufficiently long as to provide for the necessary throw of the cross slide both outwardly and inwardly and the end walls of the said slot constituting suitable limiting means for stopping the said handle at the ends of its two strokes. The slot is of a definite length preferably by reason of which a definite movement of said cross slide when shifted through the agency of the screw 9 and nut 12 is assured. The handle 13' is in convenient reach of the operator using the handle 7.

To prevent accidental shifting movement of the handle 13' due to its weight, when in either of its shifted positions I prefer to provide some positive means to hold said handle in its two extreme shifted positions. For this purpose I have represented a spring plunger 16 carried by the boxing 13 and the pointed or taper tip of which is adapted to alternately enter seats or sockets each denoted by 17 in the periphery of said nut. While the plunger holds the said handle 13' securely against accidental movement it is a simple matter to shift said handle by manual force to effect the operation of the cross slide 4. I prevent overthrow of the cross slide when the same is being returned to an adjusted position and also solidly hold the same in said adjusted position whereby accuracy and precision in results are possible.

In making the adjustments which are usual in lathes I prefer to rely upon the feed-screw 6 and nut 5 which operate after the familiar fashion to adjust the tool with respect to the work. During the action of the feed screw 7 it turns in the sleeve nut 9 but the two parts have no relative movement. Should it become necessary at any time to move the tool away from the work without affecting the precise and carefully regulated relation between said nut and feed-screw this can be accomplished instantly and easily by the manipulation of the handle 13' in the manner previously set forth.

In practice I will provide means of a positive nature to prevent turning of the elongated sleeve or screw 9 and in the drawings I have illustrated a means for this purpose as will now appear. Within the box 13 I have shown an upstanding pin 18 constituting a key which is adapted to enter the keyway or longitudinal channel 19 in the plain or unthreaded portion of said sleeve 19. The latter as will be evident need not be necessarily threaded throughout its entire extent, only the forward portion thereof being represented as threaded.

I do not limit myself to the construction disclosed by the present drawings and description for many variations may be adopted within the scope of my invention. For example it is not essential that the two screws and nuts be arranged as hereinbefore described this being one illustration wherein a departure may be had from the particular exposition herein made, of said invention.

What I claim is:

1. The combination of a cross slide, a nut and a feed-screw for adjusting said cross slide, a screw sleeved on said feed-screw, for reciprocating the latter, and a nut for moving the screw which is sleeved on said feed-screw in an endwise direction.

2. The combination of a cross slide, a nut connected with said cross slide, a feed-screw coöperative with said nut, a screw sleeved onto said feed-screw for reciprocating the latter, a boxing having a slot and a bore intersecting said slot to receive said sleeved screw, and a nut set into said slot and fitted to said sleeved screw.

In testimony whereof I affix my signature in presence of two witnesses.

BENGT M. W. HANSON.

Witnesses:
HEATH SUTHERLAND,
F. E. ANDERSON.